United States Patent [19]

Clauer et al.

[11] 4,385,992
[45] May 31, 1983

[54] WATER SOFTENER CONTROL

[75] Inventors: Arlen E. Clauer, Brookfield; Jeffrey G. Franks, Milwaukee, both of Wis.

[73] Assignee: Autotrol Corporation, Milwaukee, Wis.

[21] Appl. No.: 278,184

[22] Filed: Jun. 29, 1981

[51] Int. Cl.³ .............................................. B01J 49/00
[52] U.S. Cl. ................................... 210/662; 210/678; 210/687; 210/96.1; 210/191
[58] Field of Search ............... 210/662, 670, 678, 687, 210/96.1, 139, 140, 190, 191, 269, 277, 278; 521/26

[56] References Cited

U.S. PATENT DOCUMENTS

| | | | |
|---|---|---|---|
| 2,628,192 | 2/1953 | Ziegelman | 210/189 |
| 3,574,330 | 4/1971 | Prosser | 210/139 |
| 4,332,678 | 6/1982 | Spiegl | 210/96.1 |

Primary Examiner—Ivars C. Cintins

Attorney, Agent, or Firm—Quarles & Brady

[57] ABSTRACT

A water softener control includes a cell of sampling resin which received periodic samples of water which has passed through a major portion of the softening bed. The sampling resin changes volume when it becomes exhausted and the change in volume is employed to initiate regeneration of the softening bed. At the start of the regeneration cycle, regenerative fluid is delivered directly to the sampling resin as well as to the softening bed. The delivery to the sampling resin is through a control valve which is piloted by pressures at a venturi injector which is used to withdraw regenerative fluid from a brine tank. A vacuum operated control valve which is responsive to the closing of an air check valve in the connection between the injector and the brine tank may be employed to positively close the connection from the sampling cell to the injector when the supply of regenerative fluid is exhausted.

11 Claims, 4 Drawing Figures

WATER SOFTENER CONTROL

BACKGROUND OF THE INVENTION

This invention relates to water softening apparatus, and more particularly to an improved automatic control for the regeneration of a water softener tank.

Several different approaches to the control of the regeneration of a water softener resin bed are in use. They vary in sophistication from a simple manual control in which the user manipulates valves to accomplish the steps necessary for withdrawing the resin bed from service connecting the bed first to a source of regenerative fluids and then to a source of rinse water, and then returning the bed to service. A more automatic control will typically include a timer which triggers the automatic manipulation of valves for the regeneration cycle at a particular day of the week and time of day. The most sophisticated are controls which sense the condition of the water being treated and initiate regeneration when the quality of the water indicates that the resin bed is becoming exhausted. The present invention has to do with these automatic sensing type of water softener control.

An example of an automatic sensing water softener control is found in U.S. Pat. No. 3,574,330 issued Apr. 13, 1971 to David G. Prosser and assigned to the assignee of this application. That sensor control combines a sensing mechanism which detects the exhaustion of the resin bed and a timer which provides a drive through a multiport valve that causes the proper hydraulic circuit changes to accomplish regeneration of the resin bed. The sensing mechanism consists of a small volume of ion exchange resin held in a cell separate from the resin bed, a mechanism to detect the change of the cell resin which will occur between the conditions when the cell resin is regenerated and when it is exhausted, and a linkage to cause the timer to start a regeneration sequence. The timer also has the function of operating a small valve every twenty-four hours to allow a flow of water through the cell resin. This flow of water originates from a probe located in the softener resin bed and flows through the sensor cell to drain. Since the water being withdrawn from the resin bed of the softener has already passed through a major portion of that bed, it should be softened so that it has no effect on the cell resin. If the resin bed is exhausted to the level of the probe, the water withdrawn will cause the cell resin to change volume. In the specific commercial implementation the resin shrinks and this shrinkage is detected by the output mechanism which then causes the timer to start a regeneration sequence of valve shiftings.

During the subsequent regeneration of the softening resin bed the sensing cell resin must also be regenerated so as to return it to its initial volume. This has been accomplished by opening the valve between the probe and the sensing cell during the brine and rinse period of the regeneration sequence. With this valve open, brine in the softening resin bed flows through the cell thereby regenerating the cell resin. Rinse water which has passed through the softening resin bed will also pass through the cell resin.

The foregoing arrangement for regenerating the cell resin may not produce the desired results. This appears to be caused by two factors. First, the brine which enters the probe inlet on its way to the cell resin has already passed through a major portion of the softening resin bed. In doing so there will have been an exchange of calcium and magnesium ions with the sodium ions. As a result the brine that enters the probe inlet can contain a high relative proportion of calcium and magnesium ions to sodium ions and there is an insufficient supply of sodium ions to make the necessary ion exchange in the cell resin. Since the cell resin is not fully regenerated, when next tested by the timer, it would not have returned to its full volume and can therefore give a false signal that regeneration is required. This results in unnecessary regeneration of the softener resin bed.

Secondly, concentrated ions are found in the regeneration effluent after the typical sodium chloride brine has passed through a large portion of the softener resin bed. These concentrated ions include iron and they tend to adversely effect the cell resin. One adverse result suspected is a condition known as "packy" resin in which the resin loses its fluidity so that it will not flow when the plunger which is part of the output mechanism is brought to bear against the cell resin. This can produce a faulty signal. The problem is more acute with the special resins which are used in the sensing cell since they are selected to exhibit a greater volume change between regenerated and exhausted conditions.

The present invention provides an apparatus and method for alleviating the foregoing problems and for insuring that the cell resin is always in a condition to properly sense the need for regeneration of the softening resin bed.

SUMMARY OF THE INVENTION

In accordance with the invention there is provided a control for a water softener having a bed of softening ion exchange resin and a source of regeneration fluid, the control including a sensing cell containing an ion exchange resin which will change volume as it changes from a regenerated to an exhausted condition and means for sensing the change in volume and for providing a signal for initiation of a regeneration cycle, the improvement wherein the sensing cell is connected directly to the source of regeneration fluid during regeneration of the softening resin bed.

The invention further comprises a method of regenerating a water softener which includes periodically sensing the volume of an ion exchange resin which is subjected to water which has been passed through a major portion of the resin bed of the softener, haulting the flow of untreated water to the softener and starting the flow of a regeneration fluid followed by a rinse fluid, and thereafter returning the softener to service, the improvement wherein the sensing resin is subjected to the flow of a regeneration fluid directly from the store of regeneration fluid rather than through the softening bed.

It is also a part of the present invention to provide such a method in which the regeneration is in a direction opposite to the direction in which fluid flows through the resin in the sensing cell during withdrawal of fluid for test purposes.

The invention further contemplates the use of pressure changes at the means for withdrawing regeneration fluid from the source as a signal to control the connection of the sensing cell to the source for regeneration fluid.

It is a principal object of the invention to provide an apparatus and method for operating a water softener sensing control which insures the proper regeneration of the ion exchange resin which is employed to sense the need for regeneration of the softening resin bed.

It is another object of the invention to provide such an apparatus and method in which the ion exhange resin employed to sample the water is subjected to clean regenerant solution during tis regeneration.

The foregoing and other objects and advantages of the invention will appear in the following detailed description. In the description, reference is made to the accompanying drawings which illustrate the preferred embodiment of the invention.

DETAILED DESCRIPTION OF THE PREFERRED EMBODIMENT

Figure 1:
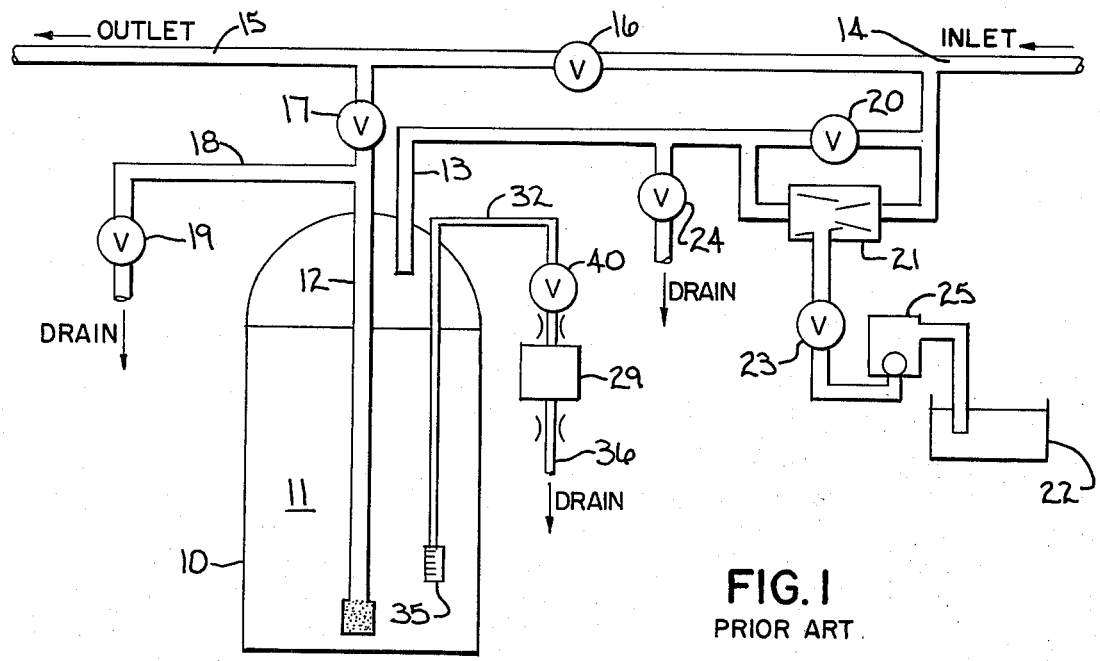
FIG. 1 is a schematic view of a prior art system for regenerating a water softener including apparatus for sensing the need for a regeneration.
Figure 4:
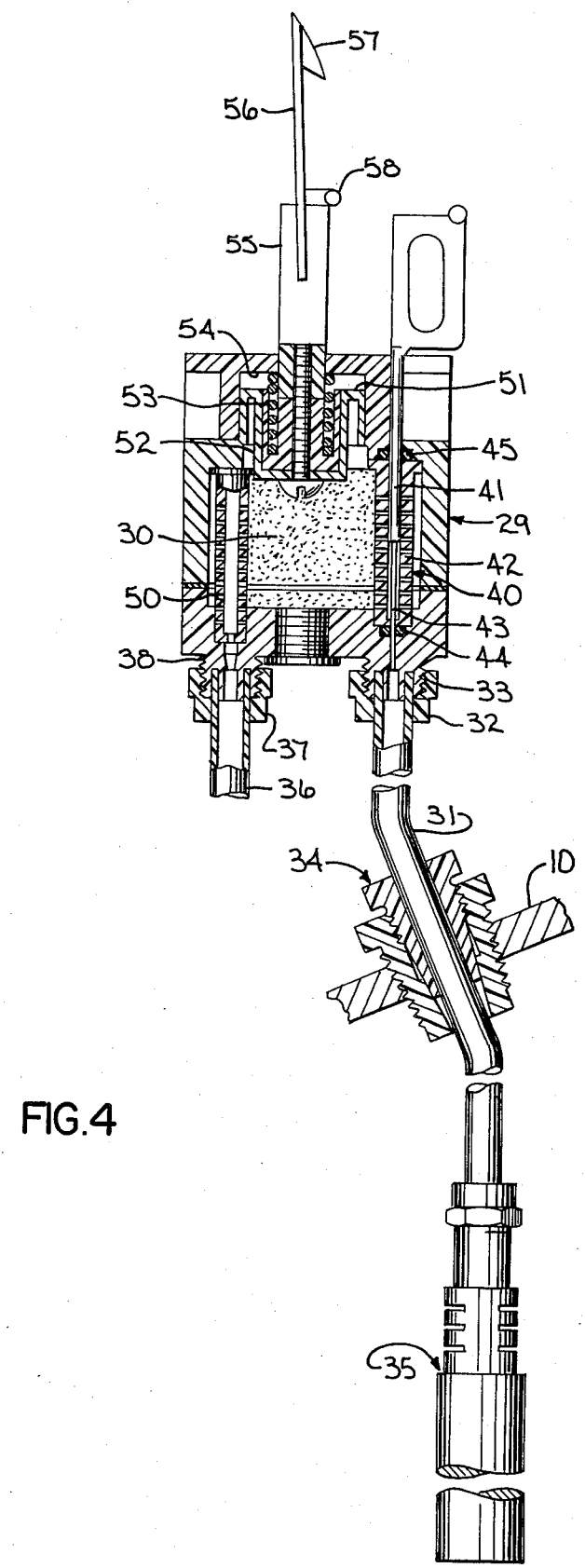
FIG. 4 is a view in elevation and partially in vertical cross-section of a sensor and a probe usable in the apparatus and method of the present invention.

Referring to FIGS. 1 and 4, existing water softener apparatus having controls of the type illustrated and described in the aforementioned U.S. Pat. No. 3,574,330 include a softening tank 10 which contains a bed 11 of ion exchange resin. An outlet tube 12 extends through the bed 11 from a point adjacent the bottom of the bed. An inlet pipe 13 extends into the softener tank 10 and has its discharge opening above the level of the bed 11. Raw water is delivered to an inlet line 14 and treated water is delivered to a service line 15. The inlet line 14 and service line 15 may be connected through a normally closed service valve 16. A second service valve 17 is normally open and is interposed between the outlet tube 12 and the service line 15. A drain line 18 containing a normally closed drain valve 19 also extends from the outlet tube 12.

Raw water can be delivered to the inlet pipe 13 through a service inlet valve 20. Alternatively, the raw water entering the inlet line 14 can pass through a brine injector 21 to withdraw brine from a brine tank 22 when a brine inlet valve 23 is open and when the service inlet valve 20 is closed. The withdrawn brine will be delivered to the inlet pipe 13 of the softener. The inlet pipe 13 is also connectable to drain through a second normally closed drain valve 24.

During service operation, the drain valves 19 and 24, the first service valve 16 and the brine inlet valve 23 would all be closed while the second service valve 17 and the service inlet valve 20 would both be open.

Raw water will then flow from the inlet line 14 through the inlet pipe 13 onto the top of the resin bed 11. The water will pass through the bed 11 and treated water will be withdrawn from the bottom of the bed 11 through the outlet tube 12 to the service line 15.

The bed 11 will eventually become exhausted. In the typical softening process this means that the resin bed 11 has changed from a sodium to a calcium condition. To regenerate the bed 11, a control will first close the service inlet valve 20 and open the first service valve 16 and the second drain valve 24. Raw water from the inlet line 14 can then be fed to the outlet tube 12 to backwash the resin bed 11 with the backwash water exiting through the inlet pipe 13 to drain through the now open second drain valve 24. Water is continued to be supplied to the service line 15 at this time even though it has not been treated.

The backwash is followed by a brining and rinse. For this operation, the second service valve 17 and the second drain valve 24 would be closed, while the brine inlet valve 23 and the first drain valve 19 are opened. Raw water would then be forced through the injector 21 and brine would be drawn from the brine tank 22 through an air check valve 25 and the open brine valve 23 and would be discharged into the tank 10 through the inlet pipe 13. The brine will pass through the resin bed 11 and will exit to drain through the outlet tube 12 and the now open first drain valve 19. When the contents of the brine tank 22 has been exhausted, the air check valve 25 will close to prevent air from being injected into the system, and water will continue to flow through the injector 21 free of brine. This water will function to rinse the resin bed 11 to remove excess brine. Untreated water will be supplied to the service line 15 during this stage of operation.

During the next stage of operation the brine tank 22 is refilled and the softener bed 11 is purged. This is accomplished by opening the service inlet valve 20 and the second service valve 17. Raw water can then enter the brine tank 22 through the open brine valve 23 and can enter the tank 10 through the inlet pipe 13. Water passing through the bed 11 will exit to the drain 19 and will also be supplied to the service line 15 after some purge time.

The apparatus is returned to a service condition by closing the first service valve 16, the first drain valve 19 and the brine inlet valve 23.

The control of the initiation of the regeneration cycle is accomplished by the use of a sensor which includes a cell 29 having a hollow interior containing a sample of an ion exchange resin 30 which will shrink when exposed to hard water. As shown in FIG. 4, a flexible sampling tube 31 is suspended by a threaded sleeve 32 on a tubular fitting 33 that protrudes from the bottom of the cell 30, and the sampling tube 31 passes through an adjustable gripping seal 34 that is screw mounted in an upper wall of the softener tank 10. A weighted intake nozzle or probe 35 is fastened on the end of the sampling tube 31 and is suspended in the bed 11 of softener resin inside the tank 10. An exhaust tubing 36 is fastened by a threaded sleeve 37 to a tubular fitting 38 that protrudes from the bottom of the cell 30 on the opposite side from the sampling tube 31.

A valve assembly 40 normally closes the mouth of the sampling tube 31 and has a valve stem 41 that extends upwardly out of the cell 29. Inside the cell 29, a vertical tube 42 which has a plurality of vertically spaced transverse openings houses a needle 43 on the end of the valve stem 41. A pair of O-ring seals 44 and 45 are fixed in annular seats at opposite ends of the tube 42. The valve stem 41 is sealed through the upper O-ring 45 and the needle 43 is inserted snuggly through the lower O-ring 44 to close the valve assembly 40. To open the valve assembly 40, the valve stem 41 is lifted thereby withdrawing the needle 43 from the lower O-ring 44.

A vertical drain tube 50, that is vented with a plurality of transverse slots or openings, extends from the inner mouth of the tubular fitting 38 which opens outwardly into the exhaust tubing 36. Thus, fluids introduced to the chamber of the cell 29 through the valve assembly 40 will tend to flow horizontally across the chamber into the vertical drain tube 50 and then down into and out through the exhaust tubing 36.

A flexible diaphragm 51 extends across and seals the top of the interior of the cell 29. The diaphragm 51 is a soft, rubber membrane that is sealed about its peripheral edges and which passes beneath a mechanical sensor in the form of a plunger 52 to which it is fastened by a screw. A compression spring 53 urges the plunger 52 downwardly. One end of the compression spring 53 bears against a spring seat in the plunger 52 and the other end bears against the top 54 of the cell.

The plunger 52 in the cell 30 has a rod 55 extending from it and projecting out of the cell 29 upwardly into a housing (not shown). An arm 56 extends from the end of the rod 55 and has a latch 57 on its upper end that is positioned to engage a segment gear in the gear train of a timing mechanism which is fully described and illustrated in the aforesaid U.S. Pat. No. 3,574,330 to which reference should be made. A cam follower 58 projects outwardly from the arm 56 on the rod 55 to ride on a cam surface (not shown) which is also a part of and is actuated by the timing gear train. The cam surface normally engages the cam follower 58 and raises the rod 55 upwardly against the urgings of the compression spring to hold the bottom of the plunger 52 including the diaphragm 51 out of the engagement with the cell resin 30. When a sensing of the sample 30 is called for, the cam surface releases the cam follower and the plunger 52 is driven downwardly by the compression spring 53.

The introduction of water through the probe 36 is controlled by the valve assembly 40. The movement of the valve assembly 40 is also controlled by the timing gear train. When the valve stem 41 is raised upwardly, the needle valve 43 will open and water will be admitted through the probe into and across the cell resin 30. The water will exit through the exhaust tube 36 to drain.

In operation, the sensing function is set to operate at a particular time of day, usually during the early morning hours when the demand for softened water is nonexistent. At that time, the valve assembly 40 would be opened by the timing operation to allow water to pass through the sensing cell resin 30. That will continue for about 20 minutes. If the water is hard, indicating that the softening bed 11 has been exhausted to the point of the probe, the cell resin 30 will also be exhausted and will shrink in volume. The plunger 52 is subsequently released by the timing gear train and allowed under the urgings of the compression spring 53 to move downwardly into the cell 29. If the sample resin 30 has shrunk, the latch 57 on the end of the arm 56 will engage a trigger in the gear train to initiate the regeneration cycle.

Not only is regeneration required of the softening resin bed 11, it is also necessary to regenerate the cell resin 30 so that it will resume its normal volume and be ready for a subsequent sensing. In the prior art, as illustrated in FIG. 1, the regeneration of the cell resin 31 was accomplished by opening the valve assembly 40 at the inlet to the sensing cell 29 and allowing regeneration fluid which had first passed through the softening resin bed 11 to enter the probe 35 and pass through the cell resin 30. A subsequent rinse was accomplished in the same manner. That method of regenerating and rinsing exposed the sensing cell resin 30 to brine which had already passed through a major portion of the softening resin bed 11 and had thereby exchanged a considerable portion of its available sodium ions for the calcium ions in the exhausted bed. The position of the probe 35 in the softening bed "determined, in part, the strength of the regenerate solution reaching the cell resin 30 so that the positioning of the probe was important. As a result, there was a risk that the regeneration fluid would not do an effective job of regenerating the cell resin.

Figure 2:
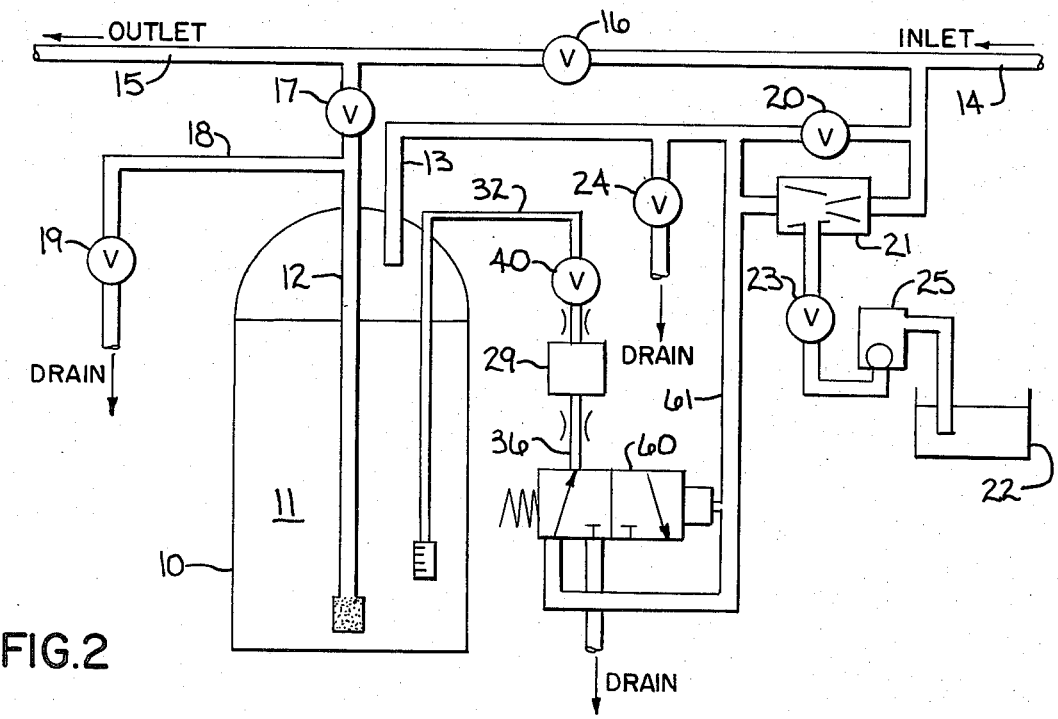
FIG. 2 is a schematic view of one embodiment of the apparatus for regenerating a water softener and controlling initiation of the regeneration in accordance with the present invention.

Referring now to FIG. 2, there is illustrated an arrangement in accordance with the present invention for regenerating the cell resin with the use of fresh, unused regenerate solution. To the extent that the arrangement is the same as that in FIG. 1 the same reference numerals have been used. A two position, three-way valve 60 is connected between the outlet tube 36 of the cell 29 and a line 61 which runs from the low pressure side of the injector 21 and from the inlet pipe 13. The valve 60 is spring biased to one position (that shown in FIG. 2) in which the line 61 leading from the low pressure side of the injector 21 is connected to the outlet tube 36 for the cell 29. The valve 60 is piloted to a second position by the presence of high pressure in the line 61 and at the outlet of the injector 21. In this second position the valve 60 connects the outlet 36 of the cell 29 to drain. For domestic operations the spring force is set such that when the pressure at the injector outlet is less than approximately 12 pounds per square inch, the spring will be capable of shifting the valve to its normal first position in which the outlet of the injector is connected to the sensing cell 29.

In operation, whenever the softener is in service the pressure at the injector outlet will be line pressure since the service inlet valve 20 will be open. This will exceed the setting for the pilot of the valve 60 and it will be shifted to connect the sensing cell 29 to drain. Then, when the valve assembly is opened by the timer, flow can pass through the cell 29 from the probe 35 to drain. The flow of water through the cell resin 30 to determine the character of the wastewater will be as in the prior art. When regeneration is required, the service inlet valve 20 will be closed and water will flow through the injector 21 drawing brine from the brine tank 22. The injector outlet will be at a reduced pressure which is significantly less than the service pressure (such as 12 psi in this example) and the spring of the valve 60 will return it to a position in which the line 61 is connected to the cell 29. Unadulterated regenerate solution can then flow directly from the injector outlet to and through the cell resin 30 as well as flowing directly from the injector outlet to and through the inlet pipe 13 to the softening resin bed 11. Regenerate solution leaving the cell 29 will flow back into the softener tank 10 via the probe 35. The amount of brine that flows through the cell resin will be a small proportion of the total brine flow because of the restrictions on the inlet and outlet sides of the cell 29 and other restrictions in the path of flow.

The valve 40 will open at or shortly after the end of the backwash cycle. This is before beginning of the brine draw and therefore prior to the opening of the brine inlet valve 23 and the drain valve 19. The valve 40 will close at an early stage of the brine and rinse period. This is to guarantee that the cell resin 30 receives brine and to prevent excessive rinsing of the cell resin. Because the rinse water is untreated, it could be sufficient to exhaust the regenerated cell resin by itself. It is not necessary to rinse the cell resin 30 immediately after brining because the initial flow of water through the cell resin 30 during a sensing operation will sufficiently rinse the resin and expand it without interference with the sensing operation.

The new apparatus and method of the invention has the further advantage that flow through the cell 30 and the probe, including the screens at the probe inlet, cell inlet and cell outlet, is reversed during regeneration. This will prevent clogging of those screens.

Figure 3:
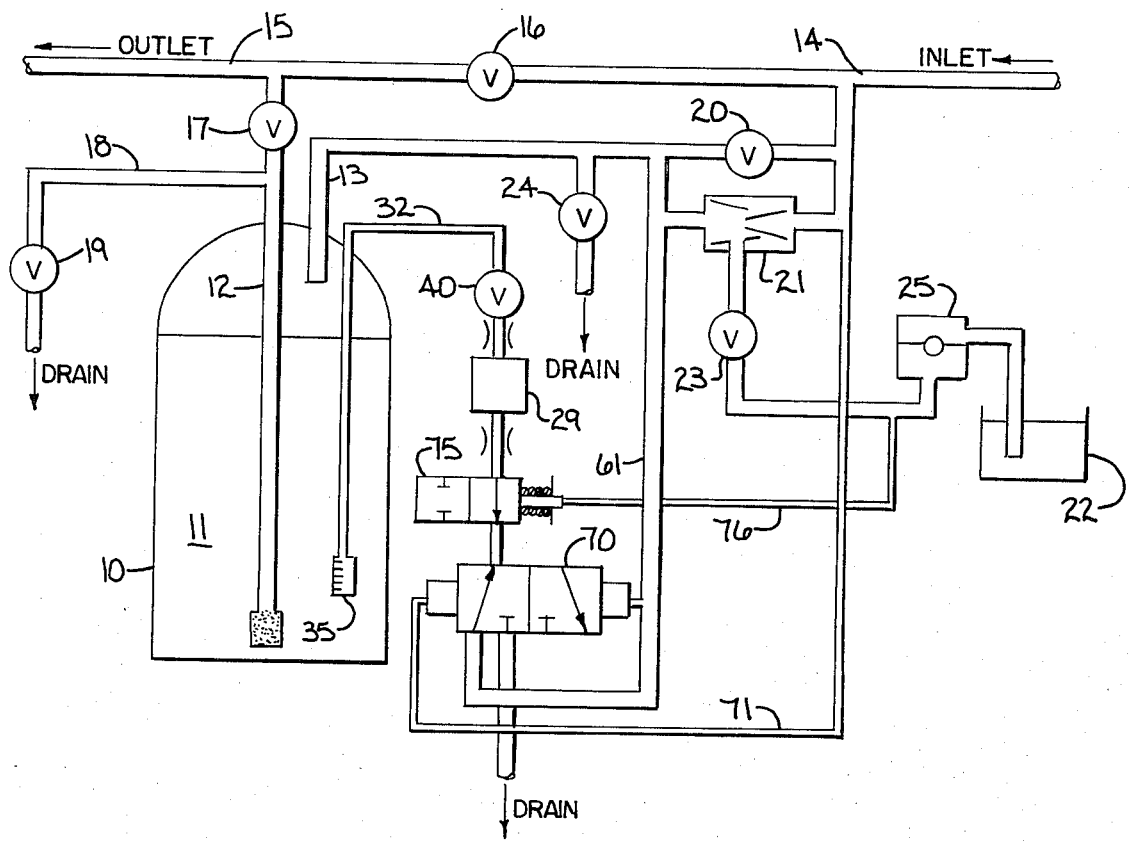
FIG. 3 is a schematic view of a second embodiment of the apparatus in accordance with the present invention.

In the alternate embodiment of FIG. 3, the pressure differential across the injector 21 is employed to control the operation of a two position, three-way valve 70. As in the first embodiment, the valve 70 is piloted by pressure in the line 61 which connects to the outlet of the injector 21 to a position in which the cell 29 is connected to drain. The valve 70 is piloted to its second position by the pressure in a pilot line 71 which connects to the inlet to the injector 21. During service when the service inlet valve 20 is open, both sides of the injector 21 will be at high pressure. Either by the assistance of a spring or by the use of differentials in surface area against which the piloting pressures work, high pressure on both sides of the injector 21 will function to pilot the valve 70 to the position where the cell 29 is connected to drain. When the service inlet valve 20 is closed and the brine valve 23 is open so as to permit the withdrawal of brine from the tank 22, the outlet of the injector 21 will be at a lower pressure while the inlet remains at high pressure. This pressure differential will function to pilot the valve 70 to its second position shown in FIG. 3 in which the line 61 and the outlet of the injector 21 are connected to the cell 29.

The embodiment illustrated in FIG. 3 includes a further change from that of FIG. 2. A two position, two-way valve 75 is disposed in the connection between the cell 29 and the two position, three-way valve 70. The two position, two-way valve 75 is a vacuum operated valve which is connected to the line between the air check valve 25 and the injector 21 by a pilot line 76. When the air check valve 25 closes because the supply of brine available for withdrawal from the tank 22 has been exhausted continued flow of water through the injector will create a vacuum in the line 76 so long as the brine valve 23 remains open. That vacuum is employed to move the valve 75 from its normal position in which it connects the cell 29 to the valve 70 and to an alternate position in which it blocks the connection. This positively prevents rinse water from passing through the cell 29 after brine is exhausted and therefore will prevent the premature exhaustion of the cell resin 30 by rinse water rather than by sampled water from the softening bed 11.

We claim:

1. In a control for a water softener having a bed of softening ion exchange resin and a source of fluid to regenerate said softening bed, the control including a sensing cell connected to receive water which has passed through said bed and containing an ion exchange resin which changes volume as it becomes exhausted, and means for sensing the change in volume and for regenerating the softening bed by directing said regeneration fluid from said source to said softening bed, the improvement wherein
said sensing cell is connectable directly to said source of regeneration fluid, and
a valve is interposed between said sensing cell and said source of regeneration fluid to control the admission of regeneration fluid to said sensing cell.

2. A control in accordance with claim 1 in which the sensing cell has an outlet and an inlet connected to a probe within said softening bed, and wherein said valve alternatively connects said outlet to drain and to said source of regeneration fluid.

3. In a control for a water softener having a bed of softening ion exchange resin in a tank and a source of fluid to regenerate said softening bed, the control including a sensing cell containing an ion exchange resin which changes volume as it becomes exhausted and having an outlet and an inlet connectable through an inlet valve to a probe disposed toward the bottom of said softening bed, means for periodically opening said inlet valve to expose said cell resin to treated water, means for sensing changes in volume of said cell resin and for initiating regeneration of said softening bed, and means for withdrawing regeneration fluid from said source and delivering the same to said softening bed, the improvement wherein
said outlet of said sensing cell is connectable directly to said regeneration fluid withdrawing means, and
a control valve is disposed in the connection between said cell outlet and said withdrawing means for alternately connecting said outlet to a drain and to said withdrawing means.

4. A control in accordance with claim 3 in which said control valve is spring biased to a position connecting said cell outlet to said withdrawing means and is piloted to its alternate position by the line pressure of untreated water being fed to said tank.

5. A control in accordance with claim 3 in which said means for withdrawing regeneration fluid comprises a venturi injector and in which the control valve is piloted between its alternate positions by the pressure differential across said injector.

6. In a control for a water softener having a bed of softening ion exchange resin in a tank, an untreated water inlet line and a source of fluid to regenerate said softening bed, the control including a sensing cell containing an ion exchange resin which changes volume as it becomes exhausted and having an outlet and an inlet connectable through an inlet valve to a probe disposed toward the bottom of said softening bed, means for periodically opening said inlet valve to expose said cell resin to treated water, means for sensing changes in volume of said cell resin and for initiating regeneration of said softening bed, an injector for withdrawing regeneration fluid from said source and delivering the same to said softening bed, and a valve selectively operatively connecting the injector between the tank and inlet line pressure, the improvement wherein
said outlet of said sensing cell is connectable to the throat outlet of said injector, and
a control valve is disposed in the connection between said cell outlet and said throat outlet,
said control valve being spring biased to a position completing the connection between the cell outlet and the throat outlet whenever the pressure at the throat outlet is reduced from inlet line pressure and being piloted to a position connecting the cell outlet to drain whenever the pressure at the throat outlet is at inlet line pressure.

7. In a control for a water softener having a bed of softening ion exchange resin in a tank, an untreated water inlet line and a source of fluid to regenerate said softening bed, the control including a sensing cell containing an ion exchange resin which changes volume as it becomes exhausted and having an outlet and an inlet connectable through an inlet valve to a probe disposed toward the bottom of said softening bed, means for periodically opening said inlet valve to expose said cell resin to treated water, means for sensing changes in volume of said cell resin and for initiating regeneration of said softening bed, an injector for withdrawing regeneration fluid from said source and delivering the same to said softening bed, and a valve selectively operatively connecting the injector between the tank and inlet line pressure, the improvement wherein said outlet of said sensing cell is connectable to the throat outlet of said injector, and a control valve is disposed in the connection between said cell outlet and said throat outlet, said control valve being piloted between a position completing the connection between the cell outlet and the throat outlet and a position connecting the cell outlet to drain by the pressure differential across said injector.

8. In a control for a water softener having a bed of softening ion exchange resin in a tank and a source of fluid to regenerate said softening bed, the control including a sensing cell containing an ion exchange resin which changes volume as it becomes exhausted and having an outlet and an inlet connectable through an inlet valve to a probe disposed toward the bottom of said softening bed, means for periodically opening said inlet valve to expose said cell resin to treated water, means for sensing changes in volume of said cell resin and for initiating regeneration of said softening bed, means for withdrawing regeneration fluid from said source and delivering the same to said softening bed, and an air check valve disposed in the connection between said withdrawing means and said source of regeneration fluid, the improvement wherein said outlet of said sensing cell is connectable to said regeneration fluid withdrawing means, a control valve is disposed in the connection between said cell outlet and said withdrawing means for alternately connecting said outlet to drain and to said withdrawing means, and a vacuum operated valve is disposed in the connection between said sensing cell and said control valve and closes such connection in response to closing of said air check valve.

9. In a method of regenerating a water softener which includes the steps of periodically withdrawing water which has passed through a major portion of the bed of softening ion exchange resin and directing such water to a separate bed of ion exchange resin which will change volume as it becomes exhausted, and sensing the volume of said separate bed and initiating regeneration cycle when the volume has changed by a predetermined amount, said regeneration cycle including supplying a regeneration fluid to the softening bed from a source the improvement wherein regeneration fluid is supplied directly from said source to said separate bed at the beginning of the step of supplying regeneration fluid to said softening bed.

10. The method of claim 9 wherein the treated water is directed through said separate bed in one direction of flow and the regeneration fluid is directed through said separate bed in the opposite direction of flow.

11. The method of claim 10 wherein the regeneration cycle includes the further step of rinsing the softener bed immediately after the regeneration fluid has been supplied to the softener bed and in which the separate bed is rinsed only by the initial flow of treated water from said softening bed to said separate bed.

* * * * *